(12) United States Patent
Fu et al.

(10) Patent No.: US 12,243,342 B2
(45) Date of Patent: Mar. 4, 2025

(54) MACHINE LEARNING TECHNIQUES FOR EXTRACTING FLOORPLAN ELEMENTS FROM ARCHITECTURAL DRAWINGS

(71) Applicant: AUTODESK, INC., San Francisco, CA (US)

(72) Inventors: Yan Fu, San Carlos, CA (US); Keith Alfaro, Brooklyn, NY (US); Manuel Martinez Alonso, Malaga (ES); Graceline Regala Amour, Boston, MA (US); Simranjit Singh Kohli, Cambridge, MA (US)

(73) Assignee: AUTODESK, INC., San Francisco, CA (US)

( * ) Notice: Subject to any disclaimer, the term of this patent is extended or adjusted under 35 U.S.C. 154(b) by 193 days.

(21) Appl. No.: 17/521,774

(22) Filed: Nov. 8, 2021

(65) Prior Publication Data
US 2022/0148327 A1     May 12, 2022

Related U.S. Application Data

(60) Provisional application No. 63/112,063, filed on Nov. 10, 2020.

(51) Int. Cl.
G06V 30/422     (2022.01)
G06V 30/184     (2022.01)

(52) U.S. Cl.
CPC .......... *G06V 30/422* (2022.01); *G06V 30/184* (2022.01)

(58) Field of Classification Search
CPC ... H04W 16/26; H04W 16/18; H04B 7/15507
See application file for complete search history.

(56) References Cited

U.S. PATENT DOCUMENTS 10,937,211 B2    3/2021    Bergin et al.
2021/0365602 A1*   11/2021   Gifford .................. G06T 17/00

FOREIGN PATENT DOCUMENTS

EP     3 506 160 A1     7/2019

OTHER PUBLICATIONS

Dosch, P., Tombre, K., Ah-Soon, C. and Masini, G., 2000. A complete system for the analysis of architectural drawings. International Journal on Document Analysis and Recognition, 3(2), pp. 102-116.*
Liu, C., Wu, J., Kohli, P. and Furukawa, Y., 2017. Raster-to-vector: Revisiting floorplan transformation. In Proceedings of the IEEE International Conference on Computer Vision (pp. 2195-2203).*

(Continued)

*Primary Examiner* — Zhitong Chen
(74) *Attorney, Agent, or Firm* — Artegis Law Group, LLP

(57) ABSTRACT

One embodiment of the present invention sets forth a technique for extracting data from an architectural drawing. The technique includes performing one or more operations via one or more machine learning models to extract a first image of a floorplan area from the architectural drawing. The technique also includes generating a boundary segmentation based on the first image of the floorplan area, wherein the boundary segmentation includes one or more boundary types for one or more portions of the floorplan area.

20 Claims, 6 Drawing Sheets

(56) References Cited

OTHER PUBLICATIONS

Zeng, Z., Li, X., Yu, Y.K. and Fu, C.W., 2019. Deep floor plan recognition using a multi-task network with room-boundary-guided attention. In Proceedings of the IEEE/CVF International Conference on Computer Vision (pp. 9096-9104) (Zeng).*
Cho, D., Kim, J., Shin, E., Choi, J. and Lee, J.K., 2020. Recognizing architectural objects in floor-plan drawings using deep-learning style-transfer algorithms. In 25th International Conference on Computer-Aided Architectural Design Research in Asia, CAADRIA 2020 (pp. 719-727). The Association for Computer-Aided.*
Extended European Search Report for Application No. 21207446.2 dated Mar. 31, 2022.
Dosch et al., "A Complete System for the Analysis of Architectural Drawings", International Journal on Document Analysis and Recognition, vol. 3, No. 2, Dec. 2000, pp. 102-116.
Zeng et al., "Deep Floor Plan Recognition Using a Multi-Task Network with Room-Boundary-Guided Attention", arXiv:1908.11025v1 [cs.CV] Aug. 29, 2019, 9 pages.
Dodge, J. Xu and B. Stenger, "Parsing floor plan images," 2017 Fifteenth IAPR International Conference on Machine Vision Applications (MVA), Nagoya, 2017, http://www.mva-org.jp/Proceedings/2017USB/papers/10-01.pdf, pp. 358-361, doi: 10.23919/MVA.2017.7986875.
Chen Liu, Jiajun Wu, Pushmeet Kohli, and Yasutaka Furukawa. Raster-to-Vector: Revisiting floorplan transformation. 2017 IEEE International Conference on Computer Vision (ICCV).
Sebastian Ochmann, Richard Vock, Raoul Wessel, Reinhard Klein ,Automatic reconstruction of parametric building models from indoorpoint clouds, Computers & Graphics vol. 54, Feb. 2016, pp. 94-103.

* cited by examiner

MACHINE LEARNING TECHNIQUES FOR EXTRACTING FLOORPLAN ELEMENTS FROM ARCHITECTURAL DRAWINGS

CROSS-REFERENCE TO RELATED APPLICATIONS

This application claims benefit of U.S. Provisional Patent Application titled "Techniques for Automatically Segmenting Rooms in Computer-Aided Design Drawings," filed Nov. 10, 2020 and having Ser. No. 63/112,063. The subject matter of this related application is hereby incorporated herein by reference.

BACKGROUND

Field of the Various Embodiments

Embodiments of the present disclosure relate generally to computer science and machine learning and, more specifically, to machine learning techniques for extracting floorplan elements from architectural drawings.

Description of the Related Art

A typical architectural floorplan includes a two-dimensional (2D) drawing of the physical layout of rooms, spaces, or other physical features of a structure. For example, an architectural floor plan could include a scaled drawing representing a view from above of a room, a floor in a building, and/or the entire building. The architectural floor plan could include depictions of walls, windows, doorways, stairways, appliances, fixtures, materials, and/or other components or areas in the floor. The architectural floor plan also could include title blocks, labels, notes, or other text annotations that identify or describe the floorplan and/or various components of the floorplan.

Because floorplans show the layout, relative sizes, and relationships among rooms, spaces, or other physical features of a structure, floorplans oftentimes play a central role when designing, constructing, or remodeling structures. For example, an architect or designer could generate and iteratively update one or more floorplans for a building being constructed or renovated until the floorplans are in line with client preferences and meet planning guidelines, building codes, and/or other requirements or constraints. In another example, a floorplan could be used as a basis for designing furniture layouts, wiring systems, and other aspects of a room or building.

While floorplan creation can be expedited using computer-based tools or programs, floorplans typically are stored or represented in ways that impede the efficient retrieval and analysis of the different types of information in the floorplans. For example, a user could create or update a floorplan by interacting with a computer-aided design (CAD) program to draw or resize lines representing walls and other exterior or interior boundaries in a building layout; add windows and doors along the boundaries; and/or drag and drop appliances, fixtures, furniture, and/or materials into the building layout. The user also could create an architectural drawing that includes the floorplan and then add dimensions, notes, or other text-based annotations to the architectural drawing. Lastly, the user could store the architectural drawing in a repository that includes a large number of other architectural documents. Problematically, the user or another user usually has to manually browse and open documents in the repository to find the floorplan within the architectural drawing or to identify other floorplans that are similar to the floorplan included in the stored architectural drawing.

To reduce time and overhead associated with retrieving and analyzing floorplans, techniques have been developed to parse and extract information from images or documents that include floorplans. One approach to extracting information from a floorplan includes binarizing an image of a floorplan into black and white pixels, using line-extraction techniques to extract boundary lines, and applying a set of rules to the boundary pixels to identify walls, windows, doors, and/or other features. One drawback of this approach, however, is that a given set of rules can be used to identify boundaries within a floorplan only when the floorplan adheres to the specific depictions of walls, windows, doors, and/or other features upon which the given set of rules is based. As a result, additional rules or sets of rules have to be created to identify boundaries in floorplans that either depict these types of features in other ways or include different or other feature types.

Other approaches to extracting information from floorplans involve the use of machine learning models to semantically segment a floorplan into walls, windows, doors, room types, and/or other features. However, these approaches are limited to predicting a fixed set of features within a floorplan and cannot be generalized to account for other components or features that may be in the floorplan beyond the fixed set of features. These machine learning approaches oftentimes involve training a machine learning model to perform multiple tasks, which can increase overall training and inference overhead. For example, a deep learning model could include two different neural network branches that perform two different tasks. The first branch could use a set of features extracted from an input image of a floorplan to predict pixels representing walls, doors, windows, and/or other boundaries in the image. The second branch could use the same features and attention weights generated by the first branch to predict pixels representing bedrooms, bathrooms, living rooms, hallways, balconies, stairways, closets, and/or other room types in the floorplan. However, the deep learning model would not be able to predict certain boundary or room types if the training data for the model does not include labels for those certain boundary or room types. Further, the multi-task nature of the deep learning model typically would increase the amount of training data needed to train the deep learning model, require additional training iterations to reach convergence, and increase resource consumption during execution of the deep learning model.

As the foregoing illustrates, what is needed in the art are more effective techniques for automatically accessing the features and elements of architectural floorplans when using a computer-aided design program.

SUMMARY

One embodiment of the present invention sets forth a technique for extracting data from an architectural drawing. The technique includes performing one or more operations via one or more machine learning models to extract a first image of a floorplan area from the architectural drawing. The technique also includes generating a boundary segmentation based on the first image of the floorplan area, wherein the boundary segmentation includes one or more boundary types for one or more portions of the floorplan area.

One technical advantage of the disclosed techniques relative to the prior art is that, with the disclosed techniques, one or more floorplans can be efficiently identified and extracted from a much larger set of stored architectural documents. Accordingly, the disclosed techniques are more scalable, more efficient, and less resource-intensive than traditional approaches that involve manual browsing, searching, or reviewing entire sets of stored architectural documents to identify and extract floorplans within the architectural documents. Another technical advantage of the disclosed techniques is that multiple smaller machine learning models are used to extract different types of semantic information from those floorplans. Consequently, the disclosed techniques are capable of extracting a greater variety of semantic information from floorplans relative to prior art approaches and also reduce the overhead incurred when training and executing the different machine learning models relative to conventional approaches that involve training and executing a single, more complex machine learning model. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
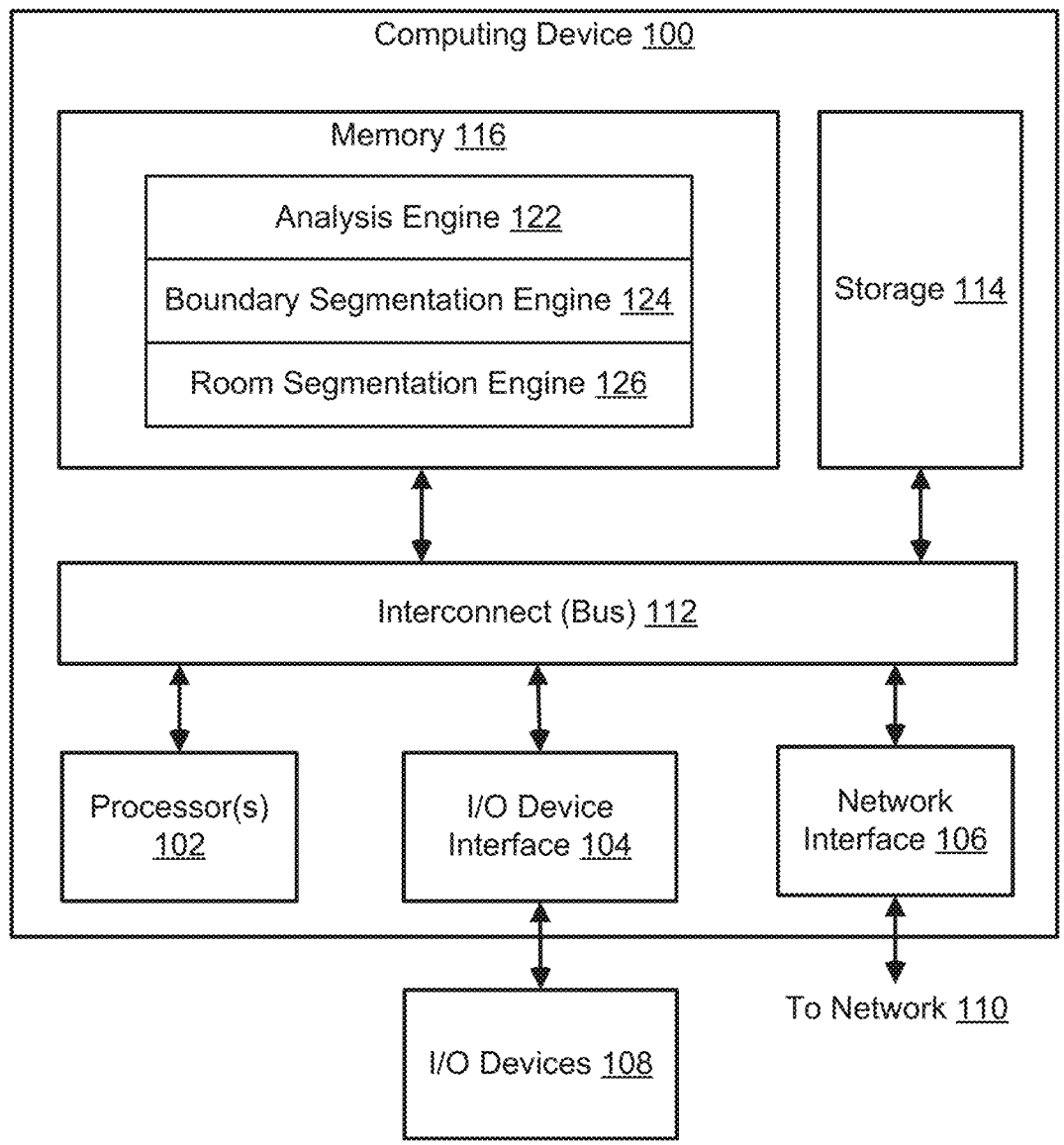
FIG. 1 illustrates a computing device configured to implement one or more aspects of the various embodiments.

FIG. 1 illustrates a computing device 100 configured to implement one or more aspects of the various embodiments. Computing device 100 may be a desktop computer, a laptop computer, a smart phone, a personal digital assistant (PDA), tablet computer, or any other type of computing device configured to receive input, process data, and optionally display images, and is suitable for practicing one or more embodiments of the present invention. Computing device 100 is configured to run an analysis engine 122, a boundary segmentation engine 124, and a room segmentation engine 126 that reside in a memory 116. It is noted that the computing device described herein is illustrative and that any other technically feasible configurations fall within the scope of the present invention. For example, multiple instances of analysis engine 122, boundary segmentation engine 124, and room segmentation engine 126 could execute on a set of nodes in a distributed and/or cloud computing system to implement the functionality of computing device 100. In another example, analysis engine 122, boundary segmentation engine 124, and/or room segmentation engine 126 could be implemented by the same or different hardware and/or software components. In a third example, various hardware and/or software components of computing device 100 could be merged, rearranged, omitted, and/or replaced with other components with similar or different functionality.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of receiving input, such as a keyboard, a mouse, a touchpad, and/or a microphone, as well as devices capable of providing output, such as a display device and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 could include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Analysis engine 122, boundary segmentation engine 124, and room segmentation engine 126 may be stored in storage 114 and loaded into memory 116 when executed.

In one embodiment, memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, analysis engine 122, boundary segmentation engine 124, and room segmentation engine 126.

Analysis engine 122, boundary segmentation engine 124, and room segmentation engine 126 include functionality to extract semantic information from an architectural floorplan via a multi-stage process. More specifically, analysis engine 122 identifies architectural drawings that include floorplans and performs cropping of images of the floorplans from the architectural drawings. Boundary segmentation engine 124 generates a boundary segmentation that assigns labels representing various types of boundaries to pixels in each image of a floorplan. Room segmentation engine 126 converts the boundary segmentation into a vectorized form and uses the boundary segmentation to perform a room segmentation that divides the corresponding floorplan into regions representing different rooms in the floorplan.

In one or more embodiments, analysis engine 122, boundary segmentation engine 124, and/or room segmentation engine 126 use various machine learning and/or image processing techniques to perform floorplan cropping, boundary segmentation, boundary vectorization, and/or room segmentation. As described in further detail below, these techniques can be used to identify and analyze floorplans within a large number or variety of architectural documents, thereby reducing manual and computational overhead associated with browsing and/or searching a large repository of architectural documents for floorplans. These techniques can also be used to extract a greater variety of semantic information than conventional image processing or deep learning techniques for recognizing floorplan elements in floorplans.

Machine Learning Techniques for Segmentation of Architectural Floorplans

Figure 2:
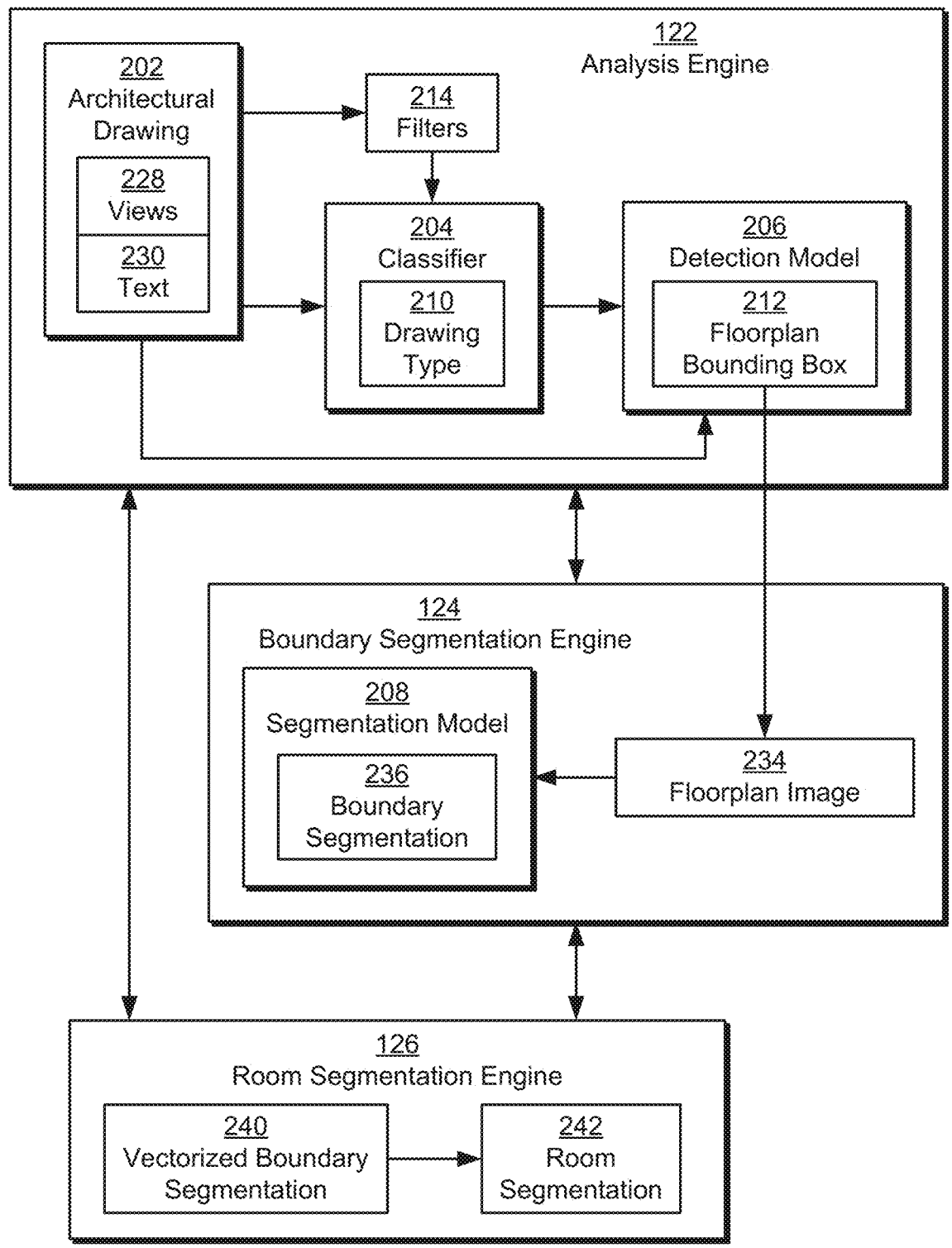
FIG. 2 includes more detailed illustrations of the analysis engine, boundary segmentation engine, and room segmentation engine of FIG. 1, according to various embodiments.

FIG. 2 includes more detailed illustrations of analysis engine 122, boundary segmentation engine 124, and room segmentation engine 126 of FIG. 1, according to various embodiments. Each of these components is described in further detail below.

Analysis engine 122 performs preprocessing that identifies, out of a potentially large number of architectural drawings, documents, and/or other types of files, an architectural drawing 202 that includes a floorplan. As shown in FIG. 2, analysis engine 122 can apply one or more filters 214 to identify a subset of the files as architectural drawings. For example, analysis engine 122 could retrieve a set of files from a directory, database, filesystem, and/or another repository that is owned, maintained, or used by an entity involved in creating or using architectural drawings. Analysis engine 122 could also use a page description language (PDL) interpreter, an optical character recognition (OCR) tool, and/or another technique to extract text 230 from each file. Analysis engine 122 could use filters 214 to compare the extracted text 230 to a prespecified list of keywords that are typically found in architectural drawings with floorplans. If text 230 from a file does not include any keywords in the list, analysis engine 122 could determine that the file is not likely to include a floorplan. If text 230 from a file includes one or more keywords in the list, analysis engine 122 could add the file to a set of "candidate" architectural drawings with a reasonable likelihood of including floorplans.

For each "candidate" architectural drawing identified by filters 214, analysis engine 122 inputs data related to one or more views 228 and/or text 230 in architectural drawing 202 into a classifier 204. Classifier 204 then generates output that indicates a drawing type 210 for the inputted data. For example, analysis engine 122 and/or another component could train a multi-label convolutional neural network (CNN), decision tree, random forest, gradient-boosted tree, logistic regression model, support vector machine, Bayesian network, ensemble model, hierarchical model, and/or another type of machine learning model implementing classifier 204 to predict a set of classes associated with a set of architectural drawings, based on text 230 in the architectural drawings, images of individual views 228 or sheets in the architectural drawings, and/or other representations of the architectural drawings. These classes could include drawing types for different types of floorplans, such as (but are not limited to) floorplans for single-family homes, multi-family buildings, hospitals, offices, retail spaces, airports, museums, and/or schools. These classes could also, or instead, include a "general" class representing any type of floorplan, one or more classes representing non-floorplan drawing types (e.g., elevation, section, projection, etc.), and/or a "default" class for a file that does not include any type of architectural drawing.

Continuing with the above example, after classifier 204 is trained, analysis engine 122 could input a new sheet, view, text 230, and/or another portion of a candidate architectural drawing 202 into classifier 204, and classifier 204 could output a set of scores that range from 0 to 1 and are correspond to the set of classes. Each score represents a probability that the candidate architectural drawing 202 belongs to a corresponding class (e.g., includes a drawing type represented by the class). When a score outputted by classifier 204 exceeds a threshold (e.g., 0.7, 0.8, etc.), analysis engine 122 could determine that the corresponding drawing type 210 applies to the candidate architectural drawing 202.

When the predicted drawing type 210 for a given architectural drawing 202 corresponds to a floorplan, analysis engine 122 uses a detection model 206 to generate a floorplan bounding box 212 for the floorplan within the image. In some embodiments, detection model 206 includes a fully convolutional neural network (FCNN) that generates features from an entire input image and uses the features to predict the coordinates and/or dimensions of one or more bounding boxes for one or more floorplans in the input image. During training, parameters of the FCNN are updated to reduce the error between a bounding box outputted by the FCNN and a labeled "region of interest" representing the area occupied by a floorplan in the input image. The FCNN can also generate a confidence score for each bounding box, where the confidence score represents the level of confidence that the bounding box includes a floorplan and/or the level of confidence in the accuracy of the bounding box. For example, the confidence score could be calculated as the probability that the bounding box contains a floorplan multiplied by the intersection over union (IoU) between the bounding box and a corresponding ground truth (i.e., labeled) region of interest.

Continuing with the above example, after the FCNN is trained, analysis engine 122 could input an image of architectural drawing 202 that is identified by classifier 204 as having a floorplan drawing type 210 into the FCNN. The FCNN could then output coordinates and/or dimensions of one or more bounding boxes in the image. When the FCNN outputs multiple bounding boxes for the image, analysis engine 122 could filter bounding boxes with confidence scores that do not meet a numeric, percentile, and/or another type of threshold. Analysis engine 122 could also, or instead, use a non-maximum suppression technique to filter bounding boxes that have high overlap with one another. As a result, analysis engine 122 could generate, from the output of detection model 206, a given floorplan bounding box 212 that is associated with a high confidence score from detection model 206 and that does not overlap significantly (or at all) with other bounding boxes outputted by detection model 206.

By using filters 214 and classifier 204 to identify architectural drawings and determine drawing type 210 for each architectural drawing 202, analysis engine 122 can efficiently extract a set of architectural drawings with floorplans from a much larger set of documents or files (e.g., in a repository). This smaller set of extracted architectural drawings can then be inputted into a more resource-intensive detection model 206 to accurately generate floorplan bounding box 212 for each floorplan in the extracted architectural drawings. Consequently, analysis engine 122 verifies that a file is likely to include a floorplan before using a relatively resource-intensive detection model 206 to generate floorplan bounding box 212 for the floorplan, thereby avoiding an increase in execution time and resource overhead that would be incurred in using detection model 206 to detect and locate floorplans in all of the documents or files.

After floorplan bounding box 212 is generated for a floorplan in a given architectural drawing 202, analysis engine 122 and/or boundary segmentation engine 124 extract a floorplan image 234 bounded by floorplan bounding box 212 from the corresponding architectural drawing 202. For example, analysis engine 122 and/or boundary segmentation engine 124 could generate floorplan image 234 by performing a cropping operation that removes pixels that fall outside floorplan bounding box 212 from an image of architectural drawing 202. Floorplan bounding boxes and floorplan images of architectural drawings are described in further detail below with respect to FIG. 3.

Boundary segmentation engine 124 uses a segmentation model 208 to generate, from floorplan image 234, a boundary segmentation 236 that associates individual pixels in floorplan image 234 with labels representing various types of boundaries in floorplans. For example, segmentation model 208 could be implemented using a deep learning model that includes an encoder that extracts features from an input floorplan image 234 and a decoder that converts the features into a segmentation of pixels in the input floorplan image 234 into background, wall, window, door, and/or other labels used to train the deep learning model. Boundary segmentations of floorplan images are described in further detail below with respect to FIG. 4.

Room segmentation engine 126 converts a raster-based boundary segmentation 236 from boundary segmentation engine 124 into a vectorized boundary segmentation 240 that includes vector representations of boundary pixels in boundary segmentation 236. For example, room segmentation engine 126 could use a CNN to convert boundary segmentation 236 into a vector-based shape of the boundary of the floorplan. The CNN could use an asymmetric convolution that runs at multiple resolutions and can detect linear features (e.g., boundaries in boundary segmentation 236) with low luminosity. For each pixel that is determined to contain linearity, the resolutions participate in a weighted optimization to compute the resulting vectorized output. In general, room segmentation engine 126 could use a variety of machine learning models, image processing tools, heuristics, and/or other techniques to convert boundary segmentation 236 into vectorized boundary segmentation 240.

Room segmentation engine 126 also generates a room segmentation 242 that divides the floorplan into discrete rooms based on vectorized boundaries in vectorized boundary segmentation 240. For example, room segmentation engine 126 could extend some or all vectorized boundaries by a fixed or variable amount to "close" gaps that can be caused by imperfect vectorization of boundary segmentation 236. Room segmentation engine 126 could then identify spaces in the floorplan that are fully enclosed by the extended vectorized boundaries as distinct rooms within the floorplan. Vectorized boundary segmentations and room segmentations are described in further detail below with respect to FIGS. 5A-5B.

Consequently, analysis engine 122, boundary segmentation engine 124, and room segmentation engine 126 extract different types of semantic information from a given architectural drawing 202. Analysis engine 122 identifies drawing type 210 associated with architectural drawing 202 and generates floorplan bounding box 212 for any floorplans in architectural drawing 202, boundary segmentation engine 124 generates boundary segmentation 236 that identifies the types and locations of boundaries within each floorplan, and room segmentation engine 126 performs vectorized boundary segmentation 240 and room segmentation 242 to partition each floorplan into regions representing different rooms.

Semantic information extracted by analysis engine 122, boundary segmentation engine 124, and room segmentation engine 126 can additionally be used to organize, compare, retrieve, or otherwise manage the corresponding architectural drawings. For example, drawing type 210, floorplan bounding box 212, floorplan image 234, boundary segmentation 236, vectorized boundary segmentation 240, room segmentation 242, and/or other semantic information generated by analysis engine 122, boundary segmentation engine 124, and room segmentation engine 126 could be stored with the corresponding architectural drawing 202 in a repository and/or used to annotate architectural drawing 202. Semantic information for multiple architectural drawings can then be used to search for or retrieve architectural drawings with floorplans, floorplans associated with a given building or project, floorplans associated with a specific drawing type 210 (e.g., floorplans for single family homes, hospitals, retail spaces, etc.), floorplans that include a certain number of rooms, floorplans that include certain types of boundaries, and/or floorplans with structural or other types of similarity to a floorplan selected by a user.

The semantic information can also, or instead, be used to perform additional analysis and/or design generation related to the corresponding architectural drawings. For example, drawing type 210, floorplan bounding box 212, floorplan image 234, boundary segmentation 236, vectorized boundary segmentation 240, room segmentation 242, and/or other semantic information generated by analysis engine 122, boundary segmentation engine 124, and room segmentation engine 126 could be used to calculate room area proportions, wall or window ratios, or other types of metrics or statistics related to the floorplans; create variations of a floorplan (e.g., by adding, removing, or adjusting walls, rooms, windows, doors, or other elements of the floorplan); generate a three-dimensional (3D) model from a floorplan; and/or identify trends or patterns related to floorplans associated with various locations, building types, drawing types, architects, customers, and/or other attributes.

In one or more embodiments, filters 214, classifier 204, detection model 206, segmentation model 208, and/or other components are trained, retrained, or otherwise updated using semantic information generated by analysis engine 122, boundary segmentation engine 124, and room segmentation engine 126. These components can also, or instead, be trained, retrained, or updated using synthetic data that is generated based on the semantic information and/or independent of the semantic information.

For example, values of drawing type 210 generated by classifier 204 can be verified by obtaining user-generated labels for the corresponding documents. The verified values and/or user-generated labels can then be used to retrain classifier 204 and/or update filters 214, so that filters 214 include a more comprehensive or accurate list of keywords associated with architectural drawings and/or classifier 204 outputs more accurate predictions of drawing type 210 for the corresponding documents.

In another example, a set of documents could be grouped or filtered by a set of high-level classes outputted by classifier 204 (e.g., architectural drawings that include floorplans, architectural drawings that do not include floorplans, documents that are not architectural drawings), and additional user-generated labels can be obtained for "subclasses" of these classes for some or all of the same documents (e.g., different floorplan or building types for architectural drawings that include floorplans). The additional labels and corresponding documents could then be used to train a new version of classifier 204, so that the new version is able to distinguish between these sub-classes. One or more versions of detection model 206 could then be trained or retrained to generate bounding box predictions for floorplans (or other objects) associated with each of the sub-classes.

In a third example, synthetic training data could be generated for detection model 206 by combining or arranging bounding boxes previously outputted by detection model 206, user-generated labels for regions of interest representing floorplan areas in architectural drawings, and/or other components of architectural drawings and/or sheets into a set of synthetic architectural drawings. The synthetic architectural drawings could then be used to retrain detection model 206, thereby allowing detection model 206 to recognize and predict bounding boxes for floorplans across various architectural drawing layouts.

In a fourth example, 2D or 3D models of buildings with defined rooms, walls, doors, windows, stairways, and/or other types of objects can be rasterized into color-coded images, where each color represents a different type of object. These rasterized images can then be used as training data for segmentation model 208.

Figure 3:
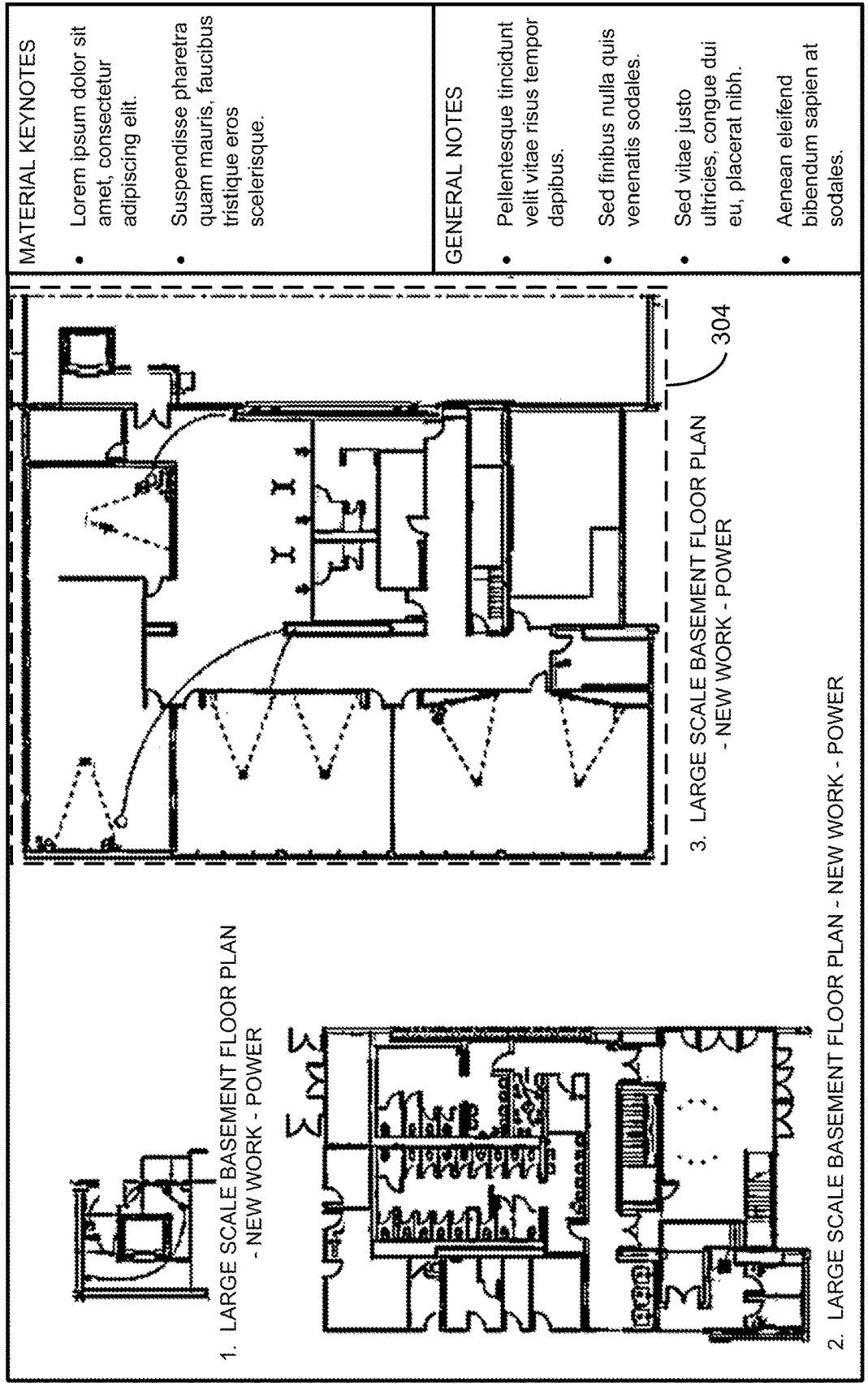
FIG. 3 illustrates an exemplar image of a floorplan area extracted from an architectural drawing, according to various embodiments.

FIG. 3 illustrates an exemplar extraction of an image 304 of a floorplan area extracted from an architectural drawing 302, according to various embodiments. As shown in FIG. 3, architectural drawing 302 includes the floorplan area, as well as title blocks, annotations, borders, and/or other elements that are not directly related to the floorplan area. One or more filters 214 can be applied to text in architectural drawing 302 to identify architectural drawing 302 as a document or file that is a "candidate" for having one or more floorplans. An image or another representation of content in architectural drawing 302 can then be inputted into classifier 204 to generate a prediction of drawing type 210 for architectural drawing 302. As described above, drawing type 210 can represent one or more types of floorplans, one or more types of architectural drawings that do not include floorplans, and/or one or more categories of documents or files that are not architectural drawings.

If drawing type 210 indicates that architectural drawing 302 includes a floorplan, an image of architectural drawing 302 is inputted into detection model 206 to generate floorplan bounding box 212 for the floorplan area. Image 304 is then generated by cropping portions of architectural drawing 302 that lie outside floorplan bounding box 212.

Figure 4:
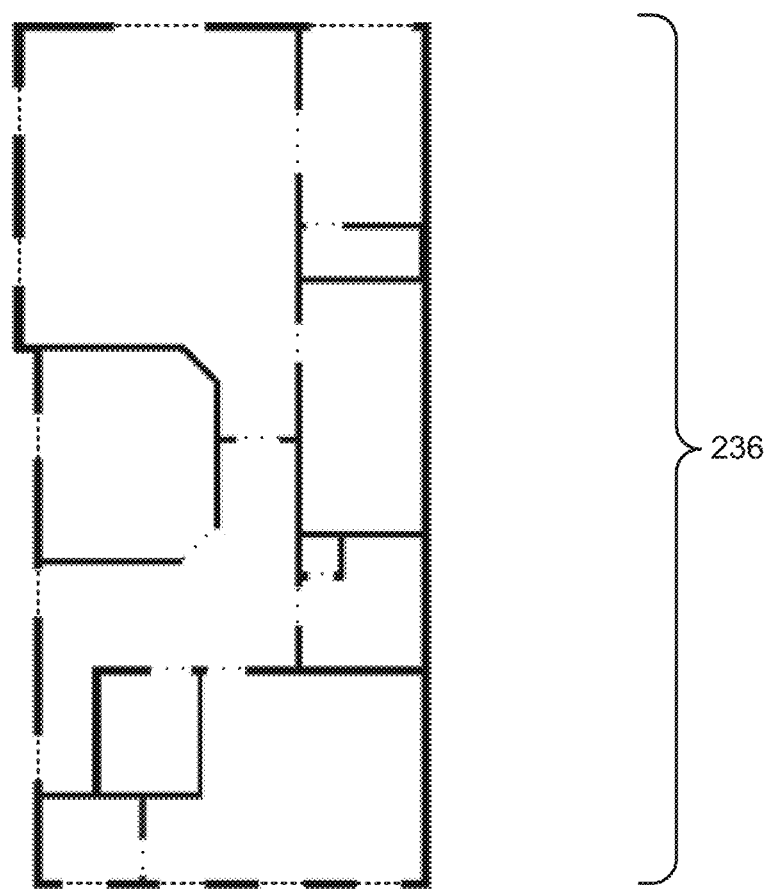
FIG. 4 illustrates an exemplar boundary segmentation for an image of a floorplan area, according to various embodiments.

FIG. 4 illustrates an exemplar boundary segmentation 236 for an image of a floorplan area, according to various embodiments. As shown in FIG. 4, the exemplar boundary segmentation 236 includes a number of labels for different pixels in the image. Pixels labeled as non-boundaries are shown in white, pixels labeled as walls are shown as solid black lines, pixels labeled as windows are shown as closely spaced dashed lines between solid lines representing exterior walls in the floorplan area, and pixels labeled as interior doors are shown as more widely spaced dashed lines between solid lines representing interior walls in the floorplan area.

As mentioned above, boundary segmentation 236 can be generated by inputting the image of the floorplan area into segmentation model 208. An encoder in segmentation model 208 extracts features from the image, and a decoder in segmentation model 208 converts the features into boundary segmentation 236.

In addition, segmentation model 208 can be adapted to detect different types of boundaries and/or portions of the floorplan area in the image. For example, one or more versions of segmentation model 208 could be trained to predict different types of rooms, stairways, elevators, and/or other spaces in the image. In another example, one or more versions of segmentation model 208 could be trained to identify appliances, fixtures, furniture, and/or materials in the image.

Figure 5B:
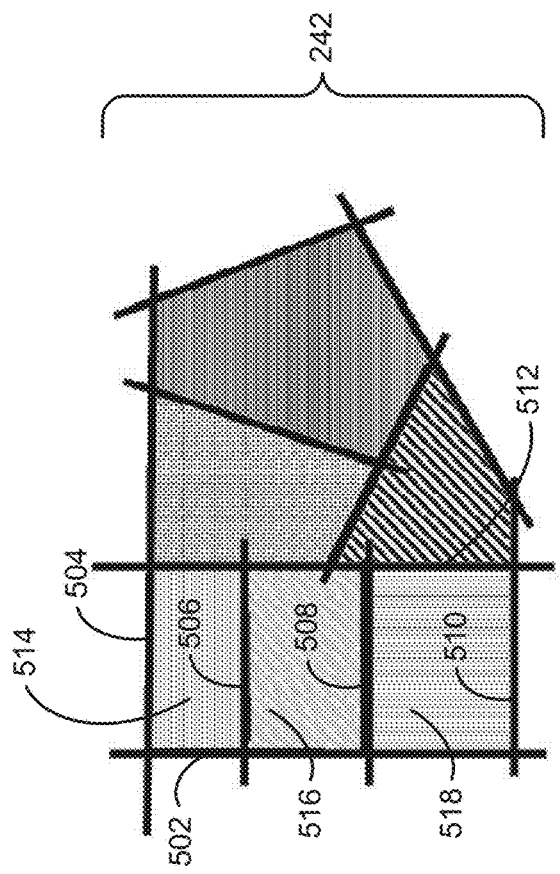
FIG. 5B illustrates an exemplar room segmentation generated for the vectorized boundary segmentation of FIG. 5A, according to various embodiments.
Figure 5A:
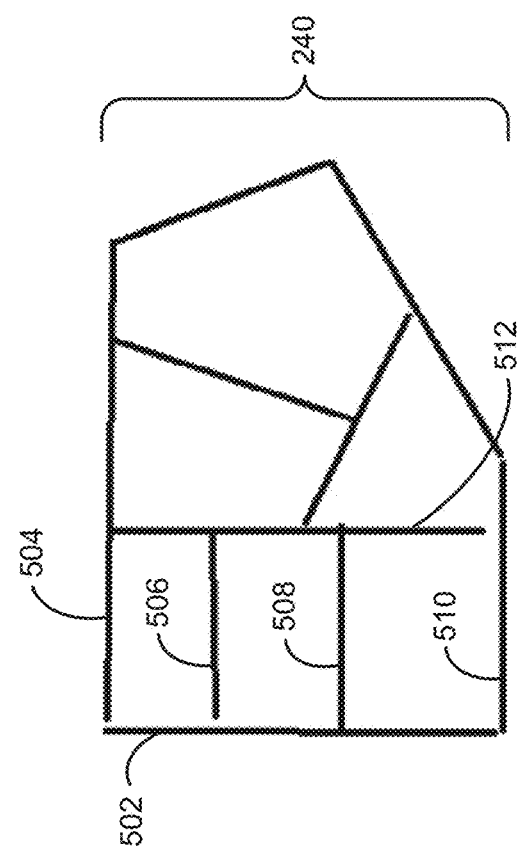
FIG. 5A illustrates an exemplar vectorized boundary segmentation for an image of a floorplan area, according to various embodiments.

FIG. 5A illustrates an exemplar vectorized boundary segmentation 240 for an image of a floorplan area, according to various embodiments. As shown in FIG. 5A, the exemplary vectorized boundary segmentation 240 includes a number of line segments 502-512 that are generated from pixels labeled with boundaries in a corresponding boundary segmentation 236. For example, line segments 502, 504, and 510 could be generated from three lines representing outer boundaries of a building in the floorplan, and line segments 506, 508, and 510 could be generated from three lines representing inner boundaries of the building in the floorplan.

FIG. 5B illustrates an exemplar room segmentation 242 generated for the vectorized boundary segmentation 240 of FIG. 5A, according to various embodiments. As shown in FIG. 5B, room segmentation 242 includes interior portions of the floorplan that have been partitioned into discrete regions representing rooms in the building. Thus, room segmentation 242 includes line segments 502-512 representing vectorized boundaries in the floorplan, as well as shaded regions 514-518 bounded by the lines that represent rooms enclosed by the vectorized boundaries.

As mentioned above, room segmentation 242 can be generated by extending some or all vectorized boundaries in vectorized boundary segmentation 240 to "close" gaps that can be caused by imperfect vectorization of boundary segmentation 236. For example, each of line segments 502-512 and other line segments in the exemplar vectorized boundary segmentation 240 of could be extended by a fixed amount, a proportion of the original length of each vector, and/or another amount. The extension of line segments 502-512 closes gaps between line segments 502 and 504, between line segments 502 and 506, and between line segments 510 and 512.

In lieu of or in addition to extending all line segments in vectorized boundary segmentation 240 of FIG. 5A to close the gaps between line segments 502 and 504, between line segments 502 and 506, and between line segments 510 and 512, each gap can be detected as a space between two vectors that falls below a threshold. The threshold can include (but is not limited to) a certain number of pixels in the original boundary segmentation 236; a proportion of the minimum, maximum, or average line segment length in vectorized boundary segmentation 240; and/or another value. When such a gap is detected, the gap is "closed" by extending one of the line segments. Thus, the gap between line segments 502 and 504 can be closed by extending line segment 504 to the left, the gap between line segments 502 and 506 can be closed by extending line segment 506 to the left, and the gap between line segments 510 and 512 can be closed by extending line segment 512 downward.

After gaps between line segments in vectorized boundary segmentation 240 of FIG. 5A have been closed, spaces in the floorplan that are fully enclosed by the extended vectorized boundaries can be identified as distinct rooms within the floorplan. For example, a region 514 that is enclosed by the intersection points of line segments 502 and 504, line segments 502 and 506, line segments 504 and 512, and line segments 506 and 512 can be identified as a first room. A region 516 that is enclosed by the intersection points of line segments 502 and 506, line segments 502 and 508, line segments 506 and 512, and line segments 508 and 512 can be identified as a second room. A region 518 that is enclosed by the intersection points of line segments 502 and 508, line segments 502 and 510, line segments 508 and 512, and line segments 510 and 512 can be identified as a third room.

Figure 6:
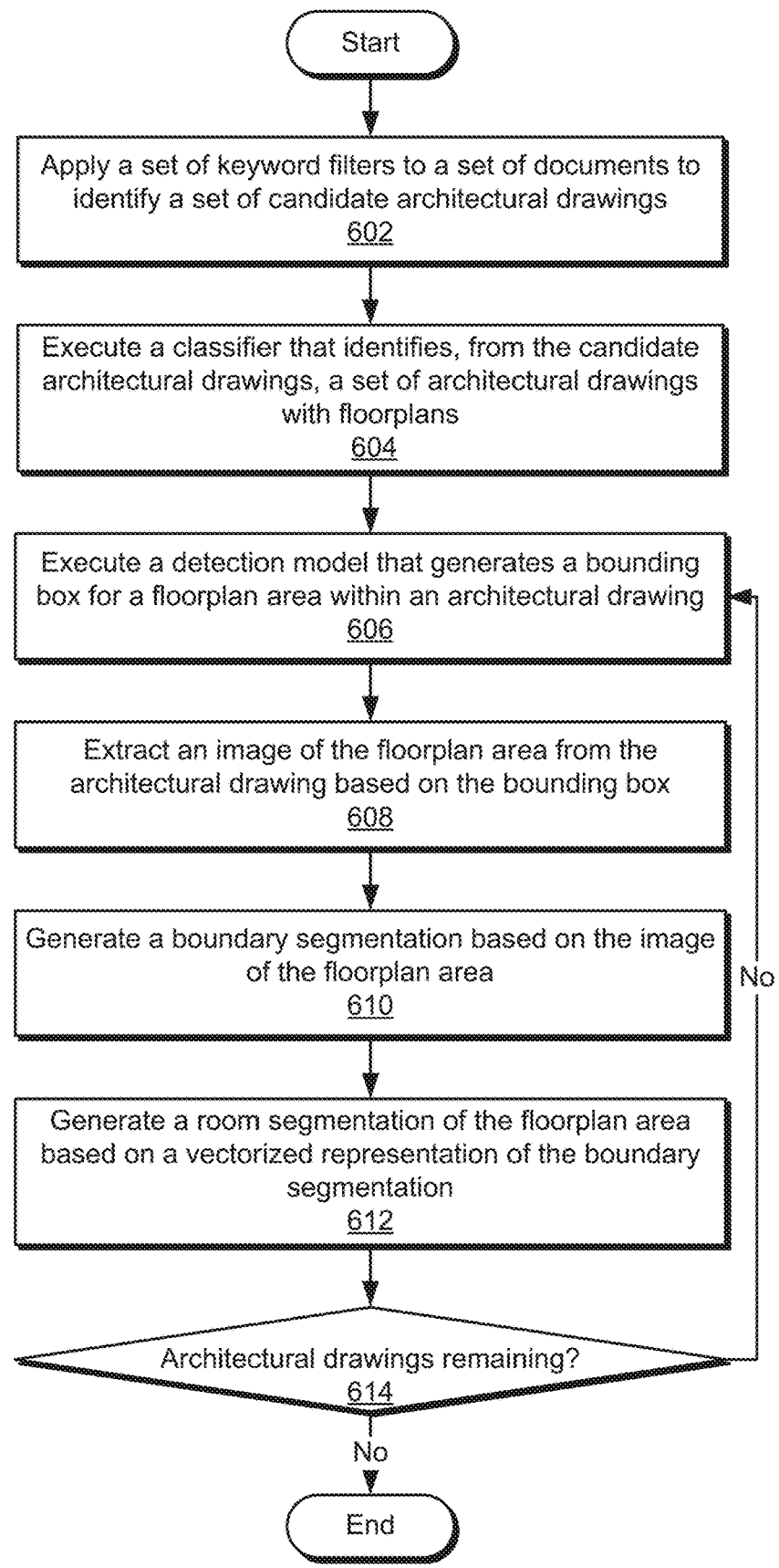
FIG. 6 sets forth a flow diagram of method steps for automatically extracting data from an architectural drawing, according to various embodiments.

FIG. 6 sets forth a flow diagram of method steps for automatically extracting data from an architectural drawing, according to various embodiments. Although the method steps are described with reference to the system of FIGS. 1-2, persons skilled in the art will understand that any system may be configured to implement the method steps, in any order, in other embodiments.

As shown, analysis engine 122 applies 602 a set of keyword filters to a set of documents to identify a set of candidate architectural drawings. For example, analysis engine 122 could retrieve a set of architectural documents from a repository. Analysis engine 122 could then identify the set of candidate architectural drawings as a subset of the architectural documents that include one or more keywords that are typically found in architectural drawings with floorplans.

Next, analysis engine 122 executes 604 a classifier that identifies, from the candidate architectural drawings, a set of architectural drawings with floorplans. For example, an image of each candidate architectural drawing, text in each candidate architectural drawing, and/or another representation of each candidate architectural drawing could be inputted into the classifier. In response to the input, the classifier could outputs a set of scores representing probabilities of various classes to which the candidate architectural drawing belongs. When a given score for the candidate architectural drawing exceeds a threshold, the architectural drawing could be determined to belong to the corresponding class. Thus, the candidate architectural drawing could be identified as an architectural drawing with one or more floorplans if the scores outputted by the classifier indicate that the candidate architectural drawing belongs to a class corresponding to a floorplan or type of floorplan.

Analysis engine 122 then executes 606 a detection model that generates a bounding box for a floorplan area within an architectural drawing identified by the classifier. For example, the detection model could include an FCNN that predicts the coordinates and/or dimensions of the bounding box based on an image of the architectural drawing.

Analysis engine 122 and/or boundary segmentation engine 124 extract 608 an image of the floorplan area from the architectural drawing based on the bounding box. For example, analysis engine 122 and/or boundary segmentation engine 124 could extract the image by cropping regions of the architectural drawing that lie outside the bounding box.

Boundary segmentation engine 124 also generates 610 a boundary segmentation based on the image of the floorplan. For example, boundary segmentation engine 124 could use an encoder to generates a set of features from the image and a decoder to converts the set of features into the boundary segmentation. The boundary segmentation includes pixels and/or other portions of the floorplan that are labeled with one or more boundary types, such as walls, windows, interior doors, exterior doors, railings, and/or stairways.

Finally, room segmentation engine 126 generates 612 a room segmentation of the floorplan area based on a vectorized representation of the boundary segmentation. For example, room segmentation engine 126 could use one or more vectorization techniques to convert the boundary segmentation into the vectorized representation. Room segmentation engine 126 could also adjust the endpoints of one or more line segments to close gaps between pairs of line segments in the vectorized representation. Room segmentation engine 126 could then determine one or more regions representing one or more rooms in the floorplan based on intersection points associated with the adjusted line segments.

Analysis engine 122, boundary segmentation engine 124, and room segmentation engine 126 may repeat operations 606-612 for any remaining architectural drawings 614. For example, analysis engine 122, boundary segmentation engine 124, and room segmentation engine 126 could generate floorplan images, boundary segmentations, and/or room segmentations for all architectural drawings with floorplans identified in operation 604. Analysis engine 122, boundary segmentation engine 124, and/or room segmentation engine 126 could also store or associate the floorplan images, boundary segmentations, and/or room segmentations with the corresponding architectural drawings. The floorplan images, boundary segmentations, and/or room segmentations could then be used to search for architectural drawings and/or floorplans and/or perform additional analysis or design generation related to the floorplans, as discussed above.

In sum, the disclosed techniques use various machine learning and image processing techniques to extract semantic information related to a floorplan from an architectural drawing. One or more keyword filters and/or a classifier are used to identify an architectural drawing as having a floorplan. A detection model is used to generate a bounding box for the floorplan within the architectural drawing, and the bounding box is used to extract an image of the floorplan from the architectural drawing. A segmentation model is applied to the image of the floorplan to generate a boundary segmentation that includes pixels in the image labeled with different boundary types. The boundary segmentation is vectorized, and intersection points of line segments representing boundaries in the vectorized boundary segmentation are used to partition the floorplan into regions representing different rooms.

Semantic information extracted from multiple architectural drawings can additionally be used to organize, compare, or otherwise manage the architectural drawings and/or corresponding floorplans. For example, floorplan images, boundary segmentations, and/or room segmentations for a large number of architectural drawings could be stored in a repository. The floorplan images, boundary segmentations, and/or room segmentations could be used to identify architectural drawings with floorplans, compare floorplans across projects, and/or retrieve floorplans that are similar to a given floorplan. The semantic information can also, or instead, be used to perform additional analysis and/or design generation related to the corresponding architectural drawings or floorplans. For example, the semantic information could be used to generate floorplans that are similar to a given floorplan or set of floorplans, generate variations on a floorplan, and/or calculate metrics or statistics related to the floorplans.

One technical advantage of the disclosed techniques relative to the prior art is that, with the disclosed techniques, one or more floorplans can be efficiently identified and extracted from a much larger set of stored architectural documents. Accordingly, the disclosed techniques are more scalable, more efficient, and less resource-intensive than traditional approaches that involve manual browsing, searching, or reviewing entire sets of stored architectural documents to identify and extract floorplans within the architectural documents. Another technical advantage of the disclosed techniques is that multiple smaller machine learning models are used to extract different types of semantic information from those floorplans. Consequently, the disclosed techniques are capable of extracting a greater variety of semantic information from floorplans relative to prior art approaches and also reduce the overhead incurred when training and executing the different machine learning models relative to conventional approaches that involve training and executing a single, more complex machine learning model. These technical advantages provide one or more technological improvements over prior art approaches.

1. In some embodiments, a computer-implemented method for extracting data from an architectural drawing comprises performing one or more operations via one or more machine learning models to extract a first image of a floorplan area from the architectural drawing, and generating a boundary segmentation based on the first image of the floorplan area, wherein the boundary segmentation includes one or more boundary types for one or more portions of the floorplan area.

2. The computer-implemented method of clause 1, further comprising generating a room segmentation of the floorplan area based on a vectorized representation of the boundary segmentation by partitioning the floorplan area into a plurality of regions representing a plurality of rooms.

3. The computer-implemented method of clauses 1 or 2, wherein generating the room segmentation of the floorplan area further comprises adjusting a plurality of endpoints for a plurality of line segments included in the vectorized representation of the boundary segmentation to produce a plurality of adjusted line segments, and determining the plurality of regions based on a plurality of intersection points associated with the plurality of adjusted line segments.

4. The computer-implemented method of any of clauses 1-3, wherein performing the one or more operations via the one or more machine learning models comprises executing a classifier that determines a drawing type associated with the architectural drawing based on a second image of the architectural drawing.

5. The computer-implemented method of any of clauses 1-4, wherein executing the classifier comprises applying the classifier to the image of the floorplan area to generate a set of scores, and applying a threshold to the set of scores to determine the drawing type.

6. The computer-implemented method of any of clauses 1-5, wherein performing the one or more operations via the one or more machine learning models comprises executing a detection model that generates a bounding box for the floorplan area based on a second image of the architectural drawing.

7. The computer-implemented method of any of clauses 1-6, further comprising generating a training dataset based on one or more outputs generated by the one or more machine learning models, and updating a plurality of parameters of the one or more machine learning models based on the training dataset.

8. The computer-implemented method of any of clauses 1-7, wherein generating the training dataset comprises combining the first image of the floorplan area with one or more images extracted from one or more additional architectural drawings to generate a synthetic floorplan.

9. The computer-implemented method of any of clauses 1-8, wherein generating the boundary segmentation comprises applying an encoder to the first image to generate a set of features, and applying a decoder to the set of features to generate the boundary segmentation.

10. The computer-implemented method of any of clauses 1-9, wherein the one or more boundary types comprise at least one of a wall, a window, an interior door, an exterior door, a railing, or a stairway.

11. In some embodiments, one or more non-transitory computer readable media stores instructions that, when executed by one or more processors, cause the one or more processors to perform the steps of performing one or more operations via one or more machine learning models to extract a first image of a floorplan area from an architectural drawing, and generating a boundary segmentation based on the first image of the floorplan area, wherein the boundary segmentation includes one or more boundary types for one or more portions of the floorplan area.

12. The one or more non-transitory computer readable media of clause 11, wherein the instructions further cause the one or more processors to perform the step of generating a room segmentation of the floorplan area based on a vectorized representation of the boundary segmentation by partitioning of the floorplan area into a plurality of regions representing a plurality of rooms.

13. The one or more non-transitory computer readable media of clauses 11 or 12, wherein generating the room segmentation of the floorplan area further comprises adjusting a plurality of endpoints for a plurality of line segments included in the vectorized representation of the boundary segmentation to produce a plurality of adjusted line segments, and determining the plurality of regions based on a plurality of intersection points associated with the plurality of adjusted line segments.

14. The one or more non-transitory computer readable media of any of clauses 11-13, wherein the instructions further cause the one or more processors to perform the step of retrieving at least one of the first image, the boundary segmentation, or the room segmentation in response to a search associated with the architectural drawing.

15. The one or more non-transitory computer readable media of any of clauses 11-14, wherein the instructions further cause the one or more processors to perform the steps of generating a training dataset based on one or more outputs generated by the one or more machine learning models, and updating parameters of the one or more machine learning models based on the training dataset.

16. The one or more non-transitory computer readable media of any of clauses 11-15, wherein generating the training dataset comprises combining the first image of the floorplan area with one or more images extracted from one or more additional architectural drawings to generate a synthetic floorplan.

17. The one or more non-transitory computer readable media of any of clauses 11-16, wherein performing the one or more operations via the one or more machine learning models to comprises applying a classifier to a second image of the architectural drawing to determine a drawing type associated with the architectural drawing, and when the drawing type corresponds to a floorplan, applying a detection model to the second image of the architectural drawing to generate a bounding box for the floorplan area.

18. The one or more non-transitory computer readable media of any of clauses 11-17, wherein performing the one or more operations via the one or more machine learning models further comprises applying one or more keyword filters to a set of documents to identify the architectural drawing.

19. The one or more non-transitory computer readable media of any of clauses 11-18, wherein the one or more boundary types comprise at least one of a wall, a window, an interior door, an exterior door, a railing, or a stairway.

20. In some embodiments, a system comprises one or more memories that store instructions, and one or more processors that are coupled to the one or more memories and, when executing the instructions, are configured to perform one or more operations via one or more machine learning models to extract a first image of a floorplan area from an architectural drawing, generate a boundary segmentation based on the first image of the floorplan area, wherein the boundary segmentation includes one or more boundary types for one or more portions of the floorplan area, and generate a room segmentation of the floorplan area based on a vectorized representation of the boundary segmentation, wherein the room segmentation comprises a partitioning of the floorplan area into a plurality of regions representing a plurality of rooms.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for extracting data from an architectural drawing, the method comprising:
performing one or more operations via one or more machine learning models to identify that at least a portion of the architectural drawing includes a first image of a floorplan area by determining that text extracted from the architectural drawing corresponds to at least one predetermined keyword associated with floorplans;
in response, extracting the first image of the floorplan area from the architectural drawing; and
generating a boundary segmentation based on the first image of the floorplan area, wherein the boundary segmentation includes one or more boundary types for one or more portions of the floorplan area.

2. The computer-implemented method of claim 1, further comprising generating a room segmentation of the floorplan area based on a vectorized representation of the boundary segmentation by partitioning the floorplan area into a plurality of regions representing a plurality of rooms.

3. The computer-implemented method of claim 2, wherein generating the room segmentation of the floorplan area further comprises:
adjusting a plurality of endpoints for a plurality of line segments included in the vectorized representation of the boundary segmentation to produce a plurality of adjusted line segments; and
determining the plurality of regions based on a plurality of intersection points associated with the plurality of adjusted line segments.

4. The computer-implemented method of claim 1, wherein performing the one or more operations via the one or more machine learning models comprises executing a classifier that determines a drawing type associated with the architectural drawing based on a second image of the architectural drawing.

5. The computer-implemented method of claim 4, wherein executing the classifier comprises:
applying the classifier to the image of the floorplan area to generate a set of scores; and
applying a threshold to the set of scores to determine the drawing type.

6. The computer-implemented method of claim 1, wherein performing the one or more operations via the one or more machine learning models comprises executing a detection model that generates a bounding box for the floorplan area based on a second image of the architectural drawing.

7. The computer-implemented method of claim 1, further comprising:
generating a training dataset based on one or more outputs generated by the one or more machine learning models; and
updating a plurality of parameters of the one or more machine learning models based on the training dataset.

8. The computer-implemented method of claim 7, wherein generating the training dataset comprises combining the first image of the floorplan area with one or more images extracted from one or more additional architectural drawings to generate a synthetic floorplan.

9. The computer-implemented method of claim 1, wherein generating the boundary segmentation comprises:
applying an encoder to the first image to generate a set of features; and
applying a decoder to the set of features to generate the boundary segmentation.

10. The computer-implemented method of claim 1, wherein the one or more boundary types comprise at least one of a wall, a window, an interior door, an exterior door, a railing, or a stairway.

11. One or more non-transitory computer readable media storing instructions that, when executed by one or more processors, cause the one or more processors to perform the steps of:
performing one or more operations via one or more machine learning models to identify that at least a portion of an architectural drawing includes a first image of a floorplan area by determining that text extracted from the architectural drawing corresponds to at least one predetermined keyword associated with floorplans;
in response, extracting the first image of the floorplan area from the architectural drawing; and
generating a boundary segmentation based on the first image of the floorplan area, wherein the boundary segmentation includes one or more boundary types for one or more portions of the floorplan area.

12. The one or more non-transitory computer readable media of claim 11, wherein the instructions further cause the one or more processors to perform the step of generating a room segmentation of the floorplan area based on a vectorized representation of the boundary segmentation by partitioning of the floorplan area into a plurality of regions representing a plurality of rooms.

13. The one or more non-transitory computer readable media of claim 12, wherein generating the room segmentation of the floorplan area further comprises:
adjusting a plurality of endpoints for a plurality of line segments included in the vectorized representation of the boundary segmentation to produce a plurality of adjusted line segments; and
determining the plurality of regions based on a plurality of intersection points associated with the plurality of adjusted line segments.

14. The one or more non-transitory computer readable media of claim 12, wherein the instructions further cause the one or more processors to perform the step of retrieving at least one of the first image, the boundary segmentation, or the room segmentation in response to a search associated with the architectural drawing.

15. The one or more non-transitory computer readable media of claim 11, wherein the instructions further cause the one or more processors to perform the steps of:
generating a training dataset based on one or more outputs generated by the one or more machine learning models; and
updating parameters of the one or more machine learning models based on the training dataset.

16. The one or more non-transitory computer readable media of claim 15, wherein generating the training dataset comprises combining the first image of the floorplan area with one or more images extracted from one or more additional architectural drawings to generate a synthetic floorplan.

17. The one or more non-transitory computer readable media of claim 11, wherein performing the one or more operations via the one or more machine learning models to comprises:

applying a classifier to a second image of the architectural drawing to determine a drawing type associated with the architectural drawing; and when the drawing type corresponds to a floorplan, applying a detection model to the second image of the architectural drawing to generate a bounding box for the floorplan area.

18. The one or more non-transitory computer readable media of claim 17, wherein performing the one or more operations via the one or more machine learning models further comprises applying one or more keyword filters to a set of documents to identify the architectural drawing.

19. The one or more non-transitory computer readable media of claim 11, wherein the one or more boundary types comprise at least one of a wall, a window, an interior door, an exterior door, a railing, or a stairway.

20. A system, comprising:
one or more memories that store instructions, and
one or more processors that are coupled to the one or more memories and,
when executing the instructions, are configured to:
perform one or more operations via one or more machine learning models to identify that at least a portion of an architectural drawing includes a first image of a floorplan area by determining that text extracted from the architectural drawing corresponds to at least one predetermined keyword associated with floorplans;
in response, extract the first image of the floorplan area from the architectural drawing;
generate a boundary segmentation based on the first image of the floorplan area, wherein the boundary segmentation includes one or more boundary types for one or more portions of the floorplan area; and
generate a room segmentation of the floorplan area based on a vectorized representation of the boundary segmentation, wherein the room segmentation comprises a partitioning of the floorplan area into a plurality of regions representing a plurality of rooms.

\* \* \* \* \*